United States Patent [19]

Kennedy et al.

[11] Patent Number: 4,484,649

[45] Date of Patent: * Nov. 27, 1984

[54] TRICYCLE

[75] Inventors: Melvin Kennedy, New York, N.Y.; Dietmar Nagel, Chester, N.J.; Avi Arad, Westport, Conn.

[73] Assignee: Nagel, Kennedy, Arad & Associates, New York, N.Y.

[ * ] Notice: The portion of the term of this patent subsequent to Oct. 9, 2001 has been disclaimed.

[21] Appl. No.: 526,157

[22] Filed: Aug. 24, 1983

Related U.S. Application Data

[63] Continuation-in-part of Ser. No. 438,397, Nov. 1, 1982.

[51] Int. Cl.³ .............................................. B62D 61/08
[52] U.S. Cl. ...................................... 180/216; 74/342; 74/405; 180/65.2; 180/65.6; 180/206; 46/457; 46/462

[58] Field of Search .............. 180/216, 214, 237, 253, 180/205, 206, 65.2, 65.6; 46/251, 206, 209; 74/342, 405, 850

[56] References Cited

U.S. PATENT DOCUMENTS

| | | | |
|---|---|---|---|
| 3,684,046 | 8/1972 | Begleiter | 180/214 |
| 3,842,928 | 10/1974 | Kishi | 180/214 |
| 4,116,084 | 9/1978 | Masuda | 46/209 X |
| 4,152,866 | 5/1979 | Suda | 46/251 |
| 4,399,883 | 8/1983 | Todokoro | 180/216 X |

FOREIGN PATENT DOCUMENTS 2023014 12/1979 United Kingdom .................. 46/206

Primary Examiner—Joseph F. Peters, Jr.
Assistant Examiner—Mitchell J. Hill

[57] ABSTRACT

A motor and pedal driven tricycle includes a system for coupling the motor to the rear wheels of the tricycle, which system automatically decouples the motor from the rear wheels when the motor is deactivated, thereby permitting free rotation of the rear wheels.

2 Claims, 7 Drawing Figures

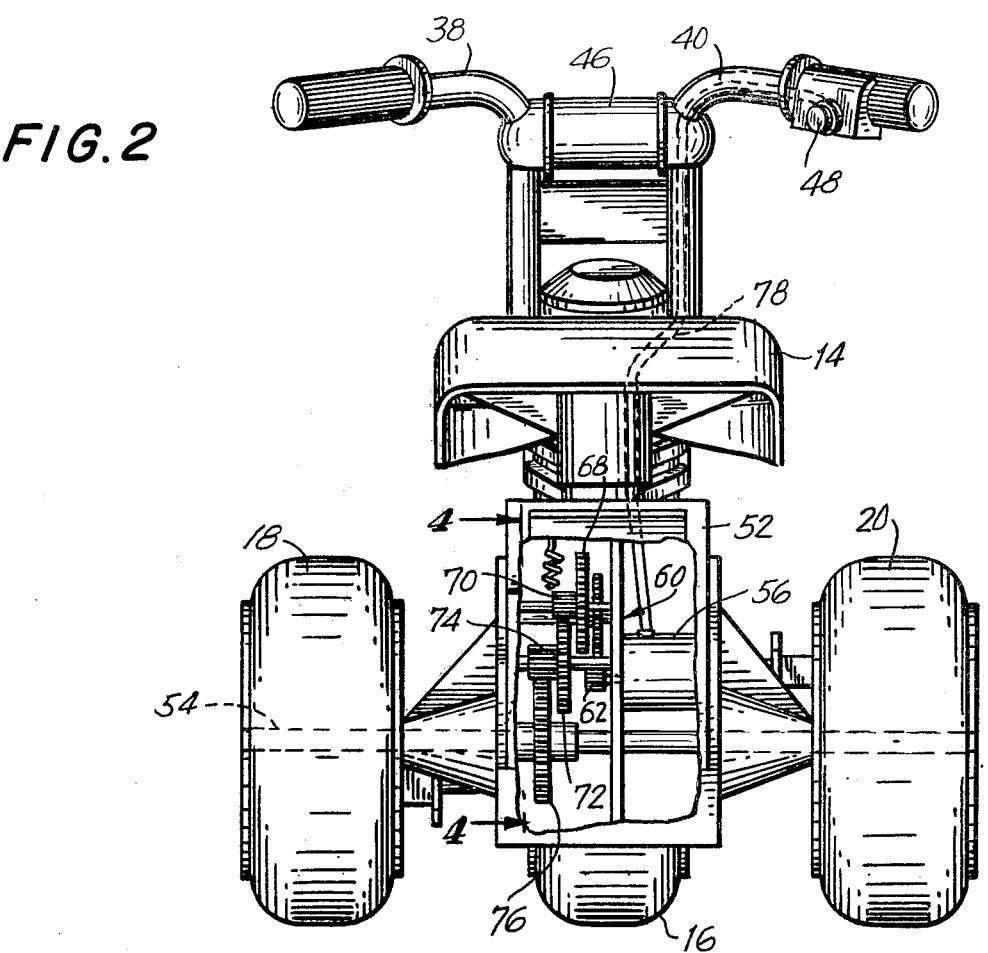
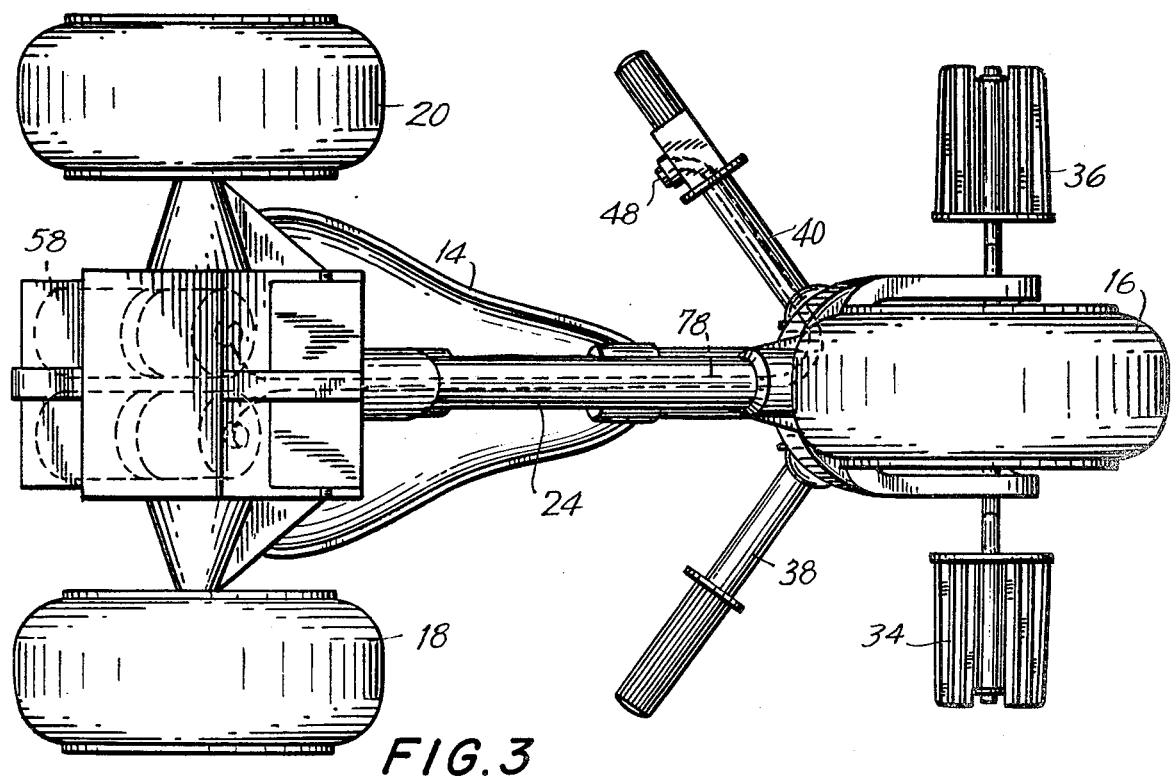

TRICYCLE

DESCRIPTION OF THE INVENTION

This is a continuation-in-part of application Ser. No. 438,397 filed Nov. 1, 1982.

The invention relates generally to tricycles, and, in particular, to pedal and motor driven tricycles.

There have been many examples of power-driven tricycles and toy cars. In general, these tricycles and toy cars have a power source, such as a motor, coupled to a transmission mechanism which is permanently coupled to the driving wheels of the toy car or tricycle. The transmission mechanism transmits driving power from the power source to the driving wheels upon activation of the motor. The motor and driving wheels are always coupled through the transmission mechanism, even when the motor is not activated, and as a result, any attempt to rotate the driving wheels when the motor is not activated can cause serious damage to the transmission mechanism and motor.

One attempt to overcome this problem is described in U.S. Pat. No. 4,152,866, which discloses a motor-driven toy car in which a motor is coupled to rear driving wheels of the car by a transmission mechanism including gears which transmit driving power from the motor to the rear wheels. Intermediate gears in the transmission mechanism are axially movable with respect to other gears in the transmission mechanism. A hand-activated lever is pivotable mounted on the car and coupled to the axially movable intermediate gears. To operate the car, the child must activate the motor and pivot the lever to cause the intermediate gears to engage the other gears in the gear train and cause power to be applied to the rear wheels. When the child wants to stop the car, the child must deactivate the motor and remember to pivot the lever to disengage the intermediate gears in the transmission mechanism in order to free the rear wheels and prevent damage to the motor and transmission mechanism which could be caused by a child attempting to move the car without activating the motor.

The car described in U.S. Pat. No. 4,152,866 does not provide a complete solution to the problem of damage to the transmission mechanism and gear train, since it requires that the child manually operate a lever after the vehicle has stopped in order to disengage the intermediate gears in the transmission mechanism. The possibility, therefore, exists that the child will either forget to operate this lever or not understand how the lever is to be operated or that, in fact, the lever should be operated and the possibility of damaging the transmission mechanism and motor remains.

As seen in our co-pending application entitled Toy Car, Ser. No. 438,397, filed Nov. 1, 1982, most of these problems have been overcome with respect to toy cars. However, further problems exist with respect to tricycles and these problems have not as yet been overcome.

Motor-driven tricycles are provided with pedals on the front wheel thereof, which may be operated to rotate the front wheel and move the tricycle along a surface. As a result, motor-driven tricycles may be both pedal driven and motor driven at the same time. While this is desirable as a teaching tool for small children and to assist the motor on steep grades or in other situations where the load placed on the motor is high, it can also cause damage to the transmission mechanism and motor if the child pedals faster than the speed at which the rear wheels are being driven by the motor.

It is to overcome these problems in the prior art that this invention was made. In particular, it is an object of the invention to provide a motor and pedal driven tricycle in which intermediate gears in a transmission mechanism automatically engage and disengage the other gears in the transmission mechanism upon, respectively, the activation and deactivation of the motor.

It is another object of the invention to provide a motor and pedal driven tricycle in which intermediate gears in a transmission mechanism automatically disengage the other gears in the transmission mechanism in response to a child pedaling the tricycle at a rate faster than the rate the tricycle is driven by the activated motor.

It is a more general object of the invention to provide a transmission mechanism for a tricycle coupled between a motor and the rear wheels of the tricycle to power the rear wheels when the motor is activated and which is automatically decoupled when the motor is deactivated to free the rear wheels for rotation, thereby preventing damage to the transmission mechanism and the motor.

In accordance with the invention, the tricycle comprises a body, a front wheel coupled to said body and having a pair of pedals which may be operated to drive the tricycle along a surface, rear wheels coupled to the body, a motor mounted to the body and a transmission mechanism for operatively and selectively coupling the motor to the rear wheels. Activating means selectively activates the motor which automatically causes the motor to be coupled to the rear wheels causing the tricycle to move under power supplied by the motor, and deactivates the motor which is automatically decoupled from the rear wheels, thereby freeing the rear wheels for rotation independently of the motor source. In addition, the tricycle may be moved along a surface in response to both the operation of the pedals and the activation of the motor.

In a particular embodiment of the invention, the transmission mechanism includes driving, intermediate and driven gears coupling the motor to the rear wheels of the tricycle. The intermediate gears are held on a rod having one end which rides in a slot formed in a wall of a housing. A spring is connected between the rod holding the intermediate gears and the housing wall. When the motor is deactivated, the spring biases the end of the rod to a first end of the slot which moves the intermediate gears out of engagement with the driving and driven gears, decoupling the motor from the rear wheels and permitting free rotation of the rear wheels. When the motor is activated, the driving gears automatically force the intermediate gears to move into engagement with the driven gears, such movement being permitted by properly sizing and placing the slot in which the end of the intermediate gear rod rides, thereby supplying power to the rear wheels to move the tricycle. When the motor is again deactivated, the spring automatically returns the end of the rod holding the intermediate gears to the first end of the slot disengaging the intermediate gears from the driven gears, thereby freeing the rear wheels for rotation. If the tricycle is driven, by operation of the pedals, at a rate of speed greater than the rate provided by the activated motor, the rod holding the intermediate gears is moved towards the first end of the slot, disengaging the intermediate gears from the driven gears, thereby permitting free-wheeling of the rear wheels.

These and other objects of the invention will become more apparent to a worker skilled in the art upon reading the following detailed description taken in conjunction with the drawings, of which:

FIG. 2 is a rear elevational view of the tricycle with parts broken away to show the motor and transmission mechanism;

FIG. 3 is a bottom plan view of the tricycle with parts shown in phantom;

Figure 6:
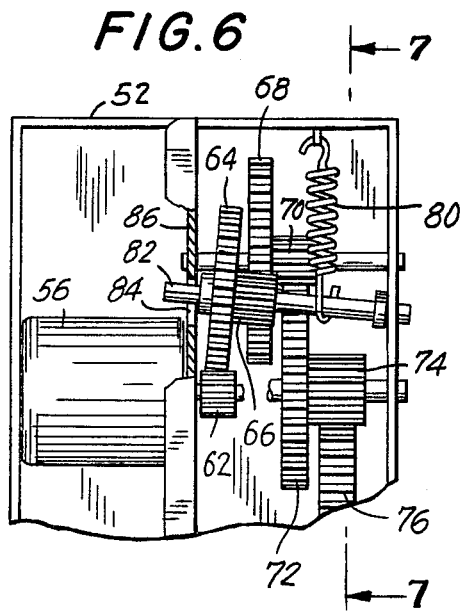
Figure 7:
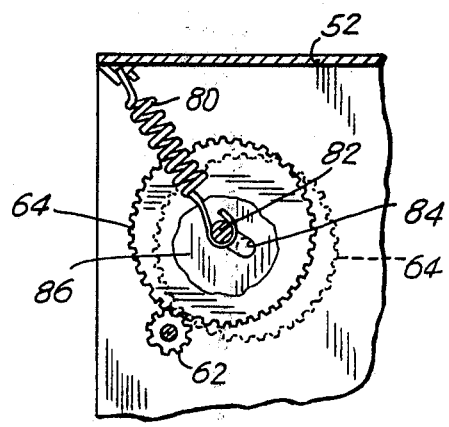

FIG. 6 is a partial and enlarged rear elevational view of the motor and transmission mechanism showing the intermediate gears disengaged from the driving and driven gears; and FIG. 7 is a sectional view taken along the line 7—7 of FIG. 6 and looking in the direction of the arrows and partially broken away to show, in full line, the spring biasing the end of the rod holding the intermediate gears to the first end of the slot to disengage the intermediate gears and, in dotted line, the position of the intermediate gears when the power source is activated.

Figure 1:
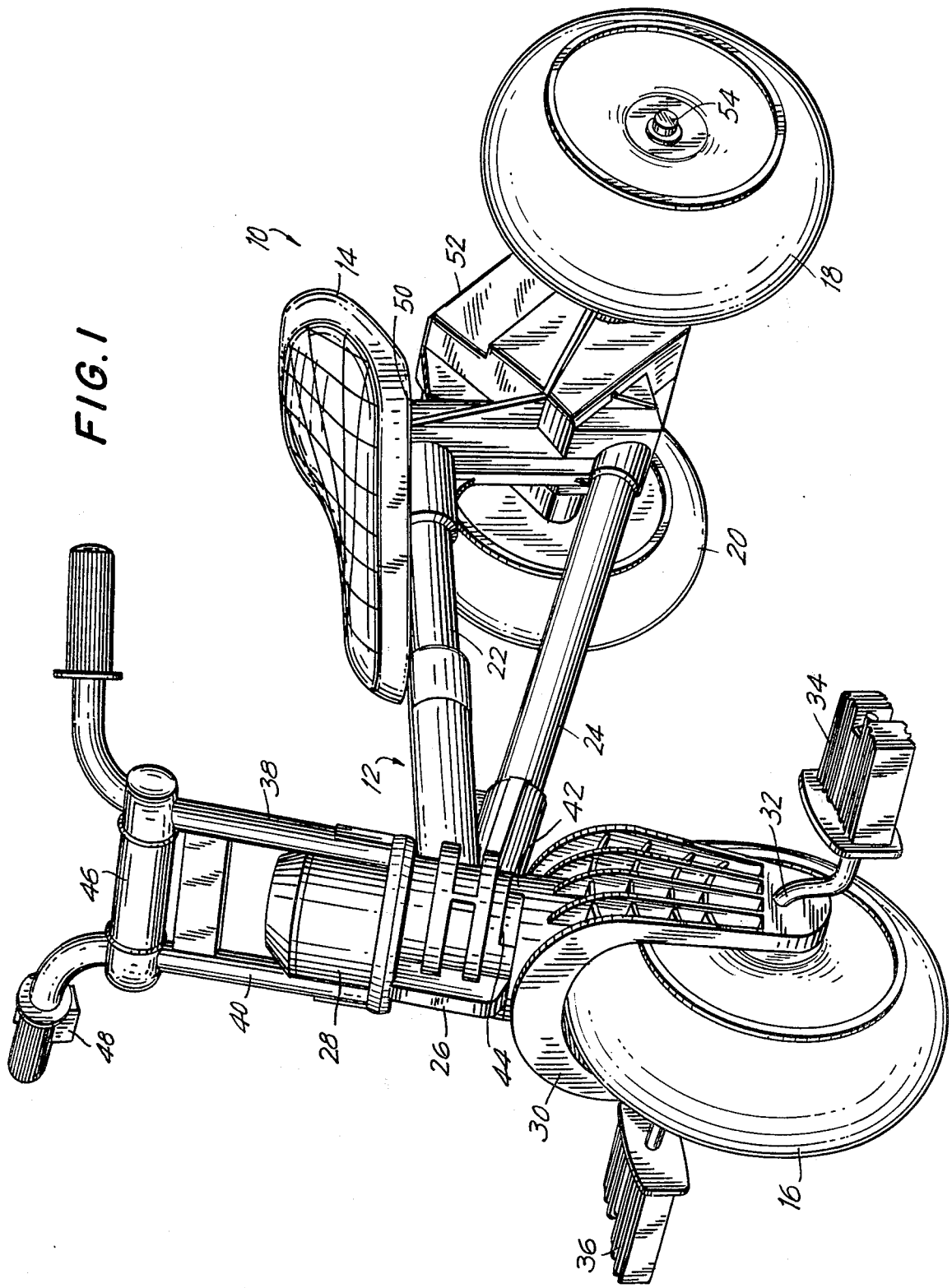
FIG. 1 is a perspective view of the tricycle of the invention.

Referring now to FIGS. 1, 2 and 3, tricycle 10 includes a body 12 formed, for example, of molded plastic or other suitable material having a seat 14 for supporting a child, front driving wheel 16 and two rear driving wheels 18 and 20.

Body 12 of tricycle 10 is formed from two tubular sections 22 and 24, one end of each terminate in a sleeve 26 which receives a steering column 28. Steering column terminates at its lower end in a fork 30 which rotatably supports front wheel 16 in an axle 32. The opposite ends of axle 32 are formed so as to receive pedals 34 and 36, which may be operated to rotate wheel 16 and move the tricycle 10 across a surface. The upper end of steering column 28 supports a pair of handle bars 38 and 40 which are used to rotate column 28 and thereby change the direction of movement of the tricycle 10. Rotation of the column 28 is limited by a boss 42 which engages the opposite ends of a slot 44 formed in the sleeve 26 after a predetermined amount of rotation of column 28 in either direction. A padded cylindrical shaft 46 extends across handle bars 38 and 40 to protect the child's head in sudden stops. In addition, handle bar 40 is formed with a single pole push switch 48 which controls the driving of the rear wheels 18 and in a manner to be more fully described hereinbelow.

The opposite ends of tubular sections 22 and 24 terminate in seat supporting sleeve 50. Sleeve 50 extends upwardly from a generally rectangular shaped housing 52. Housing 52 rotatably carries an axle 54 the opposite ends of which hold rear driving wheels 18 and 20.

Referring now specifically to FIGS. 2 through 7, mounted within housing 52, is a motor 56, for example, a low voltage electric motor operable by batteries 58, and a transmission mechanism 60, for example, a gear train including driving gear 62, intermediate gears 64 and 66 and driven gears 68, 70, 72, 74 and 76. Axle 54 connected to driving wheels 18 and 20 is secured to driven gear 76 such that when motor 56 is activated and the driving gear 62, intermediate gears 64 and 66 and driven gears 68 through 76 are all engaged, driving power is transmitted to rear driving wheels 18 and 20 to cause the tricycle to move along a surface. Motor 56 is activated in response to the activation of switch 48 which is coupled to the motor by wires 78 extending through the tricycle 10.

A coil spring 80, partially shown in FIG. 2 and shown in greater detail in FIGS. 4–7 has one end connected to the wall of housing 52 and the other end secured to rod 82 on which intermediate gears 64 and 66 are mounted. Rod 82 has one end which rides in a slot 84 formed in an intermediate wall 86 of housing 52.

Figure 4:
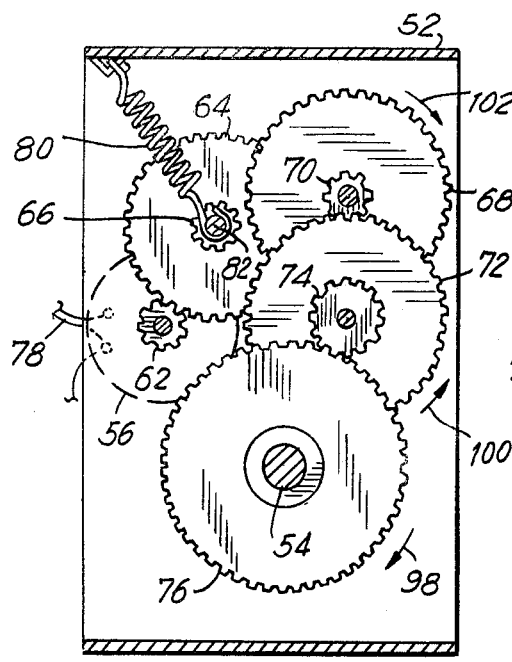
FIG. 4 is a sectional view taken along the line 4—4 of FIG. 2 and looking in the direction of the arrows and showing the intermediate gears of the transmission mechanism biased out of engagement with the driving and driven gears thereby freeing the rear wheels of the tricycle for rotation.
Figure 5:
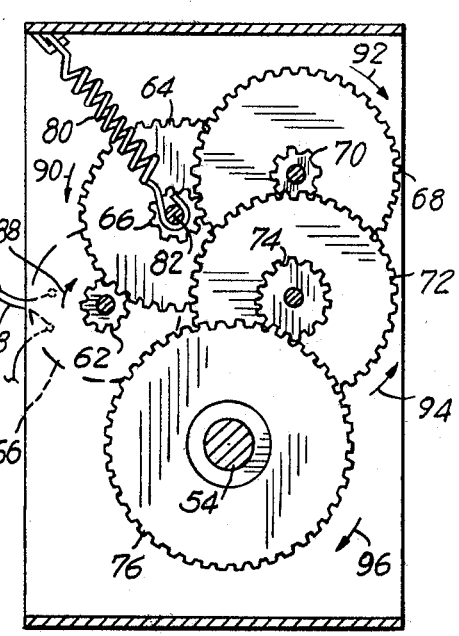
FIG. 5 is a view similar to FIG. 4, but showing the intermediate gears engaged with the driving and driven gears thereby applying power to the rear wheels of the tricycle.

As can be seen best in FIGS. 4, 6 and 7, when motor 56 is not activated, spring 80 biases rod 82 to a first end of slot 84 taking intermediate gear 66 out of engagement with driven gear 68, thereby decoupling driven gears 68, 70, 72, 74 and 76 from the driving gear 62 and motor 56. Driven gear 76 is therefore free to rotate, thereby permitting free rotation of driving wheels 18 and 20 in the absence of power from motor 56 so that the transmission mechanism and motor is not subjected to damage caused by rotation or attempted rotation of driving wheels 18 and 20 when the motor 56 is deactivated. When power is applied to motor 56 driving gear 62 rotates in a clockwise direction (see FIG. 5), causing intermediate gears 64 and 66 to rotate in a counterclockwise direction against the force of spring 80, thereby causing spring 80 to extend moving rod 82 within slot 84 until intermediate gear 66 engages driven gear 68 causing driven gear 68 to rotate in a counterclockwise direction, thereby causing rotation of driven gears 70, 72, 74 and 76 which thereby transmits power from motor 56 to rear driving wheels 18 and 20 to cause the tricycle to move along a surface. The force produced by rotation of driving gear 62 on intermediate gear 64 maintains the engagement of intermediate gear 66 and driven gear 68 during the time that motor 56 is activated. Upon deactivation of motor 56, driving gear 62 stops and the force produced by driving gear 62 on intermediate gear 64 to maintain engagement of intermediate gear 66 with driven gear 68 is removed. Spring 80 forces the end of rod 82 to move to its original rest position in slot 84 (FIGS. 4 and 7), thereby disengaging intermediate gear 66 from driven gear 68 and again freeing rear driving wheels 18 and 20 for rotation without damage to the transmission mechanism 60. Thus, the transmission mechanism automatically couples the motor 56 to rear drive wheels 18 and 20 upon activation the power motor 56 and automatically decouples motor 56 from drive wheels 18 and 20 upon deactivation of the motor to free the rear drive wheels for rotation when the motor is deactivated, thereby preventing damage to the transmission mechanism and motor. This whole operation is accomplished automatically without the necessity of moving levers or other mechanical devices which a child might inadvertently forget to move when using the tricycle.

When the motor 56 is activated, driving the rear wheels 18 and 20, and a child is driving front wheel 16 by operating pedals 34 and 36 the transmission mechanism 60 will operate as explained above as long as the child drives front wheel 16 at the same relative speed as rear wheels 18 and 20 are being driven by motor 56.

When the child drives the front wheel 16 of the tricycle such that the rate of speed of the tricycle is greater than the rate of speed provided by the activated motor through the rear driving wheels 18 and 20, axle 54 drives gear 76 in a clockwise direction thereby causing the rotation of driven gears 74, 72, 70 and 68 at a speed greater than they are normally driven by motor 56. Driven gear 68 drives intermediate gear 66 at a greater relative speed than motor driven gear 62 drives intermediate gear 64. As a result, rod 82 is moved to the first end of slot 84 moving intermediate gear 66 out of engagement with driven gear 68, and permitting freewheeling of the rear wheels 18 and 20 without damage to the motor 56 and transmission mechanism 60.

It will readily be appreciated that the mounting of one end of rod 82 in slot 84 permits intermediate gears 64 and 66 to move out of engagement with driven gear 68 (FIGS. 4, 6 and 7) to permit freewheeling of the rear wheels 18 and 20 without damage to the motor 56 and transmission mechanism 60. As the speed of the tricycle approaches the motor driven speed, the speed of driven gear 68 is reduced and driving gear 62 causes intermediate gears 64 and 66 to rotate in a counterclockwise direction against the force of spring 80 to extend moving rod 82 within slot 84 until intermediate gear 66 again engages driven gear 68. Driven gear 68 then causes the rotation of driven gears 70, 72, 74 and 76 thereby transmitting power from motor 56 to rear driving wheels 18 and 20.

Switch 48 is a single pole push or pressure activated switch, which is biased in the open position such that electrical power is normally not supplied to motor 56. Switch 48 serves a safety function as it will only supply electrical power to the motor 56 while it is depressed by the child. Once the child releases the switch, electrical power is no longer supplied to the motor 56.

Upon activation of the switch 48 electrical power is supplied to the motor 56 which is then activated. Activation of motor 56 causes rotation of driving gear 62 in the clockwise direction indicated by arrow 88, FIG. 5, which, in turn, causes rotation of intermediate gear 64 in the counterclockwise direction, indicated by arrow 90, FIG. 5, thereby forcing rod 82 carrying intermediate gears 64 and 66 to move in slot 84 against the biasing force of spring 80 until intermediate gear 66 engages driven gear 68. Driven gear 68 then rotates in the clockwise direction, indicated by arrow 92 which, in turn, causes driven gears 72 and 74 to rotate in the counterclockwise direction indicated by arrow 94 which, in turn, causes driving gear 76 to rotate in the clockwise direction as indicated by arrow 96, thereby causing rotation of axle 54 and driving wheels 18 and 20 to cause movement of the tricycle.

Upon release of the switch 48 electrical power to motor 56 is removed, thereby causing rotation of motor 56 and driving gear 62 to stop. The absence of rotation of driving gear 62 removes the force on intermediate gear 64 which force had caused the movement of rod 82 in slot 84 and extended spring 80. Spring 80 is now free to contract to the position shown in FIG. 4 moving the end of rod 82 back to its rest position at one end of slot 84 (FIG. 7) which moves intermediate gear 66 out of engagement with driven gear 68. Driven gears 76, 74, 72, 70 and 68 are now free to rotate (as indicated by arrows 98, 100 and 102) upon the rotation of driving wheels 18 and 20 caused by a child pedaling the tricycle 10 without activating motor 56. Freeing the rear drive wheels 18 and 20 is accomplished automatically upon the deactivation of motor 56 and does not depend upon the subsequent operation by the child of another mechanism to bring about this result.

While what has been described is the presently preferred embodiment of the invention, it will be apparent to those skilled in the art that modifications and changes can be made to the invention while keeping within the spirit and scope thereof which is set forth in the appended claims.

We claim:

1. A tricycle comprising a body, a front wheel coupled to said body, a pair of pedals operatively coupled to said front wheel, said pedals adapted to be operated to cause said front wheel to rotate and move said tricycle along a surface, a pair of rear wheels coupled to said body, a motor mounted to said body, transmission means operatively and selectively coupling said motor to said rear wheels and means for activation of said motor, said transmission mechanism including a drive gear drivingly engaged with said motor, driven gear means operatively engaged with said rear wheels, and at least one intermediate gear capable of selective engagement with said driven gear means and in constant engagement with said driving gear, said driving gear causing a torsional force to be exerted on said intermediate gear upon activation of said motor, and spring means operatively engaged to exert a force on said intermediate gear to bias said intermediate gear out of engagement with said driven gear means when said motor is not activated, the force exerted by said spring means on said intermediate gear being overcome by said torsional force caused by said driving gear on said intermediate gear during activation of said motor to cause said intermediate gear to engage said driven gear means to drive said rear wheels.

2. A tricycle comprising a body, a front wheel coupled to said body, a pair of pedals secured to said front wheel, said pedals adapted to be manually operated to cause said front wheel to rotate and move said tricycle along a surface, a pair of rear wheels coupled to said body, a motor mounted to said body, an activation means coupled to said body for activating said motor, a transmission mechanism drivingly engaged with said motor and selectively coupled to said rear wheels, said transmission mechanism including a driving gear operatively coupled to said motor, driven gear means drivingly coupled to said rear wheels, a first intermediate gear in constant engagement with said driving gear and concentrically mounted with a second intermediate gear, said driving gear causing a torsional force to be exerted on said concentrically mounted first and second intermediate gears when said motor is activated, said second intermediate gear capable of selective engagement with said driven gear means, spring means operatively engaged to exert a force on said concentrically mounted first and second intermediate gears biasing said second intermediate gear out of engagement with said driven gear means when said motor is not activated, said force exerted by said spring means being overcome by said torsional force exerted on said concentrically mounted first and second intermediate gears to cause said second intermediate gear to positively engage with said driven gear means to drive said rear wheels.

* * * * *